UNITED STATES PATENT OFFICE 2,031,557

RESINOUS AMINO DERIVATIVES AND PROCESS OF PREPARING

Herman A. Bruson, Philadelphia, Pa., assignor to The Resinous Products & Chemical Co., Inc., Philadelphia, Pa.

No Drawing. Application December 8, 1933, Serial No. 701,533

20 Claims. (Cl. 260—4)

The present invention relates to a process for preparing high molecular weight, nonvolatile, resinous amines from resinous phenolic-formaldehyde condensation products, and includes the further conversion of the resinous amines thus obtained into resinous amine salts of organic or inorganic acids.

One object of this invention is to provide a new class of high molecular weight amines which are non-volatile resins and which are useful as coating compositions and in moulded plastics as plasticizers or resins.

Another object of this invention is to modify the physical and chemical properties of phenolic-formaldehyde condensation products of the well-known "Bakelite" or "Novolack" type, (registered trade-marks), and of related phenolic-formaldehyde resins so as to change their solubility in organic solvents, particularly to render them soluble in hydrocarbons.

Still another object of this invention is to convert the resinous amines obtained as hereinafter described, into resinous amine salts which are new compounds and are readily soluble in dilute aqueous acids to yield soap-like solutions which foam readily on shaking and have marked emulsifying, detergent and wetting properties. Such salts or their solutions are useful in dyeing and laundering operations as emulsifying agents. Some of them are also useful for mothproofing fabrics and as intermediates for preparing water soluble azo dyestuffs by coupling them with diazotized aromatic amines.

According to the present invention, a phenolic-formaldehyde resin is condensed with more formaldehyde and a strongly basic secondary amine to form a new compound of resinous nature in which the properties of the original phenolic-formaldehyde resin are drastically changed, due to the presence therein of a substituted amino group. By the term "phenolic-formaldehyde resin" as implied herein, is meant a fusible, soluble resin, made by condensing formaldehyde in neutral, acidic, or alkaline solution with a phenol or its nuclear substituted derivatives. The term phenol is used in a broad sense and includes polycyclic as well as monocyclic, aromatic hydroxy compounds of the type R—OH where R is an aromatic nucleus, it being understood that the phenol may contain a plurality of nuclearly substituted hydroxyl groups. For the present purpose therefore resinous condensation products of formaldehyde with phenols, such as phenol itself, p-cresol and its isomers, chlorphenols, resorcinol, tannic acid, phenylphenol, beta-naphthol, p-diphenol, p,p′(dihydroxydiphenyl)-dimethylmethane

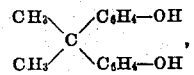

guaicol, and the like may be considered as typical starting materials. For the best results, the initial material should be a hard, brittle, acetone-soluble resin, insoluble in water or dilute acids and made either from the pure phenols or from the commercial technical mixtures of phenols, cresols, and the like. These resins may be of the so-called reactive type or of the inactive type, these terms referring to the ability of the resins to become insoluble and infusible on further heating. Regardless of the type used, the starting resin must in all cases be soluble in some inert organic solvent. The readiness with which the phenol-formaldehyde resin reacts with additional formaldehyde, in the presence of a strongly basic secondary amine is quite surprising. The condensation takes place quantitively on gentle warming, or in some cases even at room temperature. The resulting product is a new resin containing amino nitrogen which is soluble in dilute aqueous solutions of acids, such as phosphoric, acetic, lactic, oxalic and the like, in which the original resin was completely insoluble.

This behavior was not predictable, in view of the fact that it has heretofore been known that fusible, soluble phenolic-formaldehyde resins of either the non-reactive or active type, will condense further with more formaldehyde, especially when heated in the presence of acidic or basic catalysts. This converts them to the so-called "C" stage in which they are both insoluble and infusible and are extremely resistent to the action of chemicals. As catalysts for such conversions, ammonia, hexamethylenetetramine, or organic amines, triethanolamine and the like have been used. All the resins thus previously obtained, even in the "A" or "B" stage, were insoluble in acids, even on boiling, and it is upon this well recognized property of chemical inertness that the usefulness of the known phenolic-formaldehyde resins for moulding, impregnating, and coating compositions is based. The use of small quantities of amines as catalysts for the conversion of soluble and fusible phenolic-formaldehyde resins into the insoluble and infusible state is already known. For this purpose, however, only relatively small amounts of the amine are used and the resulting product is entirely different from that obtained by the process of the present invention, in which strongly basic secondary amines and additional formaldehyde are both used in appreciably greater quantities relative to the weight of the orginal resin. According to the present process, the secondary amine and the formaldehyde are both used in amounts corresponding to at least one full mol of each to a mol of the phenolic-formaldehyde resin. For the best results, at least two full mols of formaldehyde and of secondary amine are used for each mol of the resin. The process is carried out at relatively low temperatures, preferably between 20° and 100° C. Under these conditions no infusible, insoluble resins are formed, but instead the resulting product is a fusible resin which contains tertiary amino groups, and which is readily soluble at room temperature, in a large variety of organic solvents as well as in a variety of organic and mineral acids, even when these acids are highly diluted with water. Therefore the use of strongly basic secondary amines and formaldehyde in substantial amounts relative to the quantity of phenolic-formaldehyde resin at moderately low temperatures, causes the reaction to take an entirely different course, leading to the new products descibed herein.

The secondary amines which are operative in the present process are those having the general formula

wherein R and R' are each an alkyl group, or jointly a polymethylene ring. These groups must be free from aromatic groups or from acidic or acid-forming groups such as carboxyl, sulphonic and halogens, and also free of aldehydo, nitrile, and primary amino groups. The presence of aromatic groups in the secondary amine leads to unsuitable products. Secondary amines which are inoperative in this process are, for example, dibenzylamine, diphenylamine, N-methylaniline and the like. The strongly basic secondary amines which are operative in this process and which possess the general formula

are dimethylamine, diethylamine, methylethylamine, di-n-propylamine, di-iso-propylamine, di-n-butylamine, and the other isomeric dibutylamines, di-amylamines, piperidine, piperazine, diethanolamine and the like.

The phenolic-formaldehyde resins used must also be free of deleterious groups such as carboxyl, sulphonic, nitrile or aldehydo groups.

Due to the fact that the phenolic-formaldehyde resins vary considerably in molecular weight according to their method of preparation, the amounts of formaldehyde and secondary amine which are required to combine completely therewith, in order to get the desired resinous amines, can only be determined experimentally. In general, the amine and the formaldehyde are used in equi-molecular amounts. In order to determine the proper amount of amine and formaldehyde to be used for complete reaction, an excess of formaldehyde and of the amine is brought into reaction with the phenolic-formaldehyde resin. After the reaction is complete, the excess of the reagents is removed and their amounts determined. The difference between the amine employed and the amine determined as excess will show how much has combined with the resin and this figure can be used in making up subsequent batches. The excess of amine and formaldehyde can be removed by washing or by distillation in vacuo.

The term "mol equivalent", as used in the claims referring to the quantities of phenolic-formaldehyde resins employed is intended to mean the maximum amount of the resin which will react with one mol of additional formaldehyde and one mol of secondary amine to yield a product which is completely soluble in dilute acetic acid.

In carrying out this reaction, the phenolic-formaldehyde resin is preferably dissolved in a suitable inert organic solvent, such as alcohol or dioxane and mixed with the formaldehyde and the secondary amine. The formaldehyde used may be the ordinary aqueous 30 to 40% solution or anhydrous para-formaldehyde. The secondary amine may also be in the anhydrous form or in solution. Upon mixing the components together, considerable heat is evolved and in some cases the new product formed soon precipitates, (especially from alcoholic solutions) as an amorphous powder or as a syrup.

It is, however, advantageous to insure completion of the reaction by heating for several hours at about 80° to 90° C. on a hot water bath under a reflux condenser and then to remove the solvent and the excess of formaldehyde and secondary amine by washing with water or by distilling in vacuo at a low temperature, (50° to 90° C.). The dried residue obtained is generally a hard, brittle resin or syrupy mass which in contrast to the original phenol-formaldehyde resin is now readily soluble in dilute aqueous solutions of certain acids, such as phosphoric, lactic, acetic, gluconic, oxalic and others. The solutions thus obtained are clear or slightly opalescent. They foam strongly when shaken and behave generally like typical soap solutions. Those made from phenol-formaldehyde resins are also soluble in dilute alkali metal hydroxide solutions, such as sodium hydroxide, and can therefore be used as soaps in either alkaline or acidic media. Most of the resinous amines made by this process give hydrochlorides and sulphates which are considerably less soluble in water than the corresponding lactates, acetates, phosphates or oxalates. However, in a few cases even the sulphates and hydrochlorides are soluble in water as shown in some of the examples below where di-ethanolamine is used in the condensation.

Furthermore these new resinous amines combine with higher fatty acids which are insoluble in water, such as oleic, ricinoleic, stearic, palmitic, lauric, naphthenic and the like, to form resinous salts of high molecular weight, which are insoluble in water but which are readily soluble in hydrocarbons, such as toluene, xylene or kerosene, and which can be used for emulsifying oils, fats and waxes with water. Another property of these resins is that those made from the higher aliphatic amines, such as dibutylamine or di-amylamine, are readily soluble in hydrocarbons such as benzene, whereas the original phenol-formaldehyde resins used are insoluble in such solvents.

A further property of some of the resins prepared for example by condensing phenols, particularly polynuclear phenols such as diphenol, p,p'(dihydroxydiphenyl)-dimethylmethane and the like with more than one mol equivalent of formaldehyde and less than the required amount of the above mentioned secondary amines, is that these resinous amines are still reactive enough to go over to the "C" stage, infusible, insoluble resins on further heating. Since they contain tertiary amino groups, they can be chemically combined in their soluble stage with inorganic and organic acids to form salts which on further heating become insoluble and infusible. Thus it is possible to prepare amine salts of high molecular weight with organic and inorganic monobasic as well as polybasic acids. Such resinous salts are useful as coating materials and as waterproofing agents for textiles and since they are reactive, they can be converted to the insoluble, infusible stage after application. For example, if p,p'(dihydroxydiphenyl)-dimethylmethane is condensed with from two to four mols of formaldehyde and one to three mols of dimethylamine so that there is an excess of methylol groups over amino groups as expressed in the following equation:

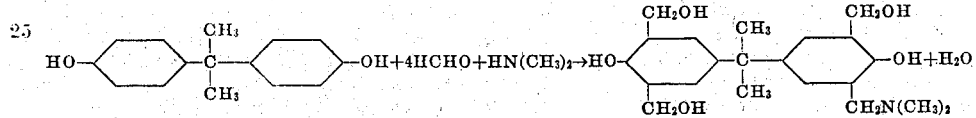

the resinous product obtained will combine at room temperature with any organic or inorganic acid to form an amine salt. Upon heating this salt further, condensation between the methylol groups occurs, leading to amine resin salts of high molecular weight showing very unique properties. If higher fatty acids, having more than eight carbon atoms, such lauric, undecylenic, ricinoleic, palmitic, oleic, stearic, hydroxystearic acids or the fatty acids from drying oils, such as linoleic, elaeostearic, linolic acids and the like, are used, the resinous salts obtained are soluble in aromatic hydrocarbons such as benzene and can be used as varnishes or lacquering materials. Other acids, such as abietic (colophony), and naphthenic also yield resins when combined as above with the high molecular weight resinous amines, which are soluble in hydrocarbons. The dibasic acids, notably phthalic, maleic, sebacic, succinic and the like, also combine with the resinous amines to give extremely reactive salts which quickly become infusible and insoluble on the application of heat. An extremely wide range of resinous amines and amine salts can be obtained, depending on the kind of secondary amine or the kind of acid, as well as the type of phenol employed.

For instance, if one mol of p,p'(dihydroxyphenyl)-dimethylmethane is heated with four mols of formaldehyde and four mols of diethanolamine, a sticky resin is obtained. It is readily soluble in water and in dilute mineral acids to give clear solutions. If only two mols of formaldehyde and two mols of diethanolamine are used, the resin obtained is insoluble in water but readily soluble in dilute mineral acids. This resin is miscible in all proportions with urea-formaldehyde and phenolic-formaldehyde resins to which it may be added as a plasticizer. Its salts with organic and inorganic acids are useful as detergents. In order to illustrate my invention further, the following examples are given but it is understood that the invention is not limited to the specific substances and conditions of operation as set forth in the examples.

In the following examples, several different resins have been used for the condensation with formaldehyde and the secondary amines. These resins are as follows:

Resin "A" is a condensation product of phenol and formaldehyde made with hydrochloric acid as a catalyst.

Resin "B" is made with technical cresol (a mixture of the meta and para-isomers), and formaldehyde, using hydrochloric acid as the catalyst.

Resin "C" is made by condensing one mol of cresol (a mixture of meta and para-isomers) with 0.8 mol of formaldehyde, using hydrochloric acid as a catalyst.

Resin "D" was prepared by condensing one mol of technical cresol as above with about 1.2 mols of formaldehyde, using caustic soda as a catalyst.

*Example 1.*—5 grams of resin "A" were dissolved in 45 ccm. of 95% alcohol and mixed with 3.5 grams 30% formaldehyde solution. To the clear solution thus obtained there was then added dropwise while shaking, 4 grams of aqueous dimethylamine solution containing 41% dimethylamine by weight. The solution became warm and gradually turned milky. After standing about 30 minutes at room temperature, a white powdery precipitate formed. This was filtered off and washed with a small quantity of cold 95% alcohol and dried. The yield was about 2 grams. The remainder of the product was present in the mother liquor from which is was isolated by removing the solvent in vacuo at 100° C. The material was a resinous hard, brittle substance which was soluble in hot alcohol but separated out on cooling to room temperature. It was readily soluble in a 5% solution of acetic acid in water as well as in dilute phosphoric, or lactic acid to give soap-like solutions, which foam strongly when shaken. It was readily soluble also in dilute sodium hydroxide solution as well as in dioxane.

*Example 2.*—5 grams of resin "A" dissolved in 20 ccm. dioxane was mixed with 3.5 grams 30% formaldehyde solution and 4 grams 41% dimethylamine solution and allowed to stand 18 hours at room temperature. Two layers formed. The mixture was heated on a steam bath in vacuo to remove the solvent, water, and excess of formaldehyde and amine. The dry product obtained was a yellow, hard, brittle, transparent resin having a melting point 110°–116° C. It dissolved readily in a 5% solution of acetic, lactic, gluconic, phosphoric, oxalic, or citric acid in water to give clear solutions which foam strongly when shaken and are useful as wetting agents.

*Example 3.*—In place of the dimethylamine solution shown in Example 2, 2 grams of pure diethylamine were used. The solution was heated 1 hour under reflux on a boiling water bath and then the solvent and volatile materials were distilled off in vacuo on a steam bath. A yellow hard, brittle resin was obtained which was readily soluble in dilute aqueous acids as described in Example 2 above. It differed from the resin obtained in Example 2 in being readily soluble in warm benzene.

*Example 4.*—5 grams resin "A" dissolved in 20 ccm. dioxane was mixed with 3.5 grams 30% formaldehyde and 4.6 grams di-n-butylamine. After the initial heat evolution had subsided, the mixture was heated 3¼ hours on a boiling water bath under reflux and then in vacuo at the same temperature to remove solvent and all volatile products. The residue was a yellow, sticky, benzene-soluble resin. It was readily soluble in dilute acetic, lactic or phosphoric acid to give clear, soap-like solutions which foamed strongly when shaken.

Similarly by using 4.7 grams of commercial diamylamine in place of the di-n-butylamine as above, a viscous, sticky benzene soluble syrup was obtained which formed salts with oleic, acetic, phosphoric and other acids.

*Example 5.*—5 grams resin "A", 20 ccm. dioxane, 3.5 grams 30% formaldehyde and 2.55 grams piperidine were heated 1½ hours on a boiling water bath under reflux. Upon distilling off the solvent and volatile materials in vacuo as described above, a yellow, hard, brittle resin was obtained. 1 gram of this resin was mixed with 19 ccm. water containing 0.8 ccm. glacial acetic acid. The clear solution formed is extremely foamy when shaken. The resin is also easily soluble in dilute aqueous phosphoric or lactic acid.

*Example 6.*—5 grams resin "A" dissolved in 20 ccm. 95% ethyl alcohol was mixed with 3.5 grams 30% formaldehyde and 4.2 grams pure diethanolamine. The mixture was allowed to stand 18 hours at room temperature (20–30° C.) and then warmed 1 hour on a boiling water bath under reflux. The solvent and water were removed by heating the product in vacuo at 100° C. for about 1 hour. The residue was a brown syrup which solidified on cooling to a hard, brittle resin. It was readily soluble not only in dilute aqueous organic acids such as acetic, oxalic and lactic acids, but also in dilute sulphuric, hydrochloric, or phosphoric acid to give soapy solutions which foamed strongly when shaken. The resin was also soluble in dilute caustic soda solution but was insoluble in water or hydrocarbons.

*Example 7.*—5 grams resin "B" was mixed with 20 ccm. dioxane, 3 grams 30% formaldehyde solution and 3.6 grams aqueous 40% dimethylamine solution. After heat evolution had subsided, the mixture was heated 1 hour on a boiling water bath (90–100° C.). The solvent and excess reagents were then distilled off in a vacuo at 100° C. A brown, hard resin was obtained which dissolved readily in aqueous 1% acetic acid solution to give a clear solution which foamed strongly when shaken. It was also soluble in 1% lactic or phosphoric acid solution to give solutions having soap-like properties.

*Example 8.*—The dimethylamine as used in Ex. 7 was replaced by a molecular equivalent amount of diethylamine and treated as in Ex. 7. A similar product was obtained. Similarly di-n-propylamine, di-n-butylamine, and piperidine were each substituted mol, for mol, in place of the dimethylamine in Ex. 7 and in each case a resin which was readily soluble in dilute acetic acid was obtained.

*Example 9.*—50 grams of resin "C" was dissolved in 150 ccm. of 95% alcohol. To this solution was added 35 grams of 30% formaldehyde solution and 42 grams of pure diethanolamine. The mixture was allowed to stand 24 hours at room temperature, and was then heated 1 hour at 80° C. under reflux on a hot water bath. The alcohol was then removed by distillation in vacuo at 50–60° C. The residue was a yellowish, hard, brittle resin. It was readily soluble in 10% phosphoric acid solution as well as in dilute aqueous acetic, lactic, or oxalic acid. In 10% hydrochloric or sulphuric acid it swelled and partially dissolved. The above aqueous acidic solutions of the resinous amine foam very strongly when shaken and behave like typical soaps. The resinous amine is also soluble in dilute caustic soda solution to give a foamy solution.

*Example 10.*—5 grams of resin "D" was dissolved in 20 ccm. dioxane and 3 grams 30% formaldehyde added. To this solution was then added 3.6 grams of aqueous 41% dimethylamine solution. The mixture became warm. After standing for about 1 hour at room temperature the solution became turbid and separated into 2 distinct layers. It was allowed to stand a total of 4 hours at 25° C. The dioxane was then distilled off in vacuo at 60–65° C. on a hot water bath. The still residue was a yellowish, hard, brittle resin. It was readily soluble in aqueous solutions of phosphoric, lactic and oxalic acids, to give soap-like solutions which foamed strongly when shaken.

*Example 11.*—22.8 grams of p,p'(dihydroxydiphenyl)-dimethylmethane (also known as diphenylolpropane), was boiled under reflux with 10 grams of 30% formaldehyde solution, 0.5 gram oxalic acid and 50 ccm. water for 1 hour and the resin which formed was separated and washed. It formed a plastic dough-like mass. This was dissolved in 50 ccm. denatured alcohol (95%) and mixed with 10 grams 30% formaldehyde solution and 12 grams aqueous 41% dimethylamine solution. The mixture was allowed to stand 24 hours at room temperature. The alcohol, water and volatile liquids were then removed in vacuo on a steam bath. The residue was a hard resin. Its solutions in dilute phosphoric or lactic acid are soap-like and foamy.

*Example 12.*—1 mol. equivalent of p,p'(dihydroxydiphenyl)-dimethylmethane was dissolved in alcohol and to the solution was added 4 mol. equivalents of aqueous 30% formaldehyde solution. While cooling and stirring there were then added 2 mol. equivalents of a 40% aqueous solution of dimethylamine. The solution was allowed to stand 24 hours and the alcohol and excess volatile products removed by heating in vacuo at 50° C. A pale yellow brittle resin was obtained which was soluble in dilute phosphoric acid. The resin was mixed with 2 mol. equivalents of linseed oil fatty acids and heated at 100–110° C. while stirring until a hard, homogeneous resin was formed. The resin was soluble in petroleum naphtha or in xylene and can be used as a coating material. Upon heating for a prolonged period this salt becomes infusible and insoluble in organic solvents. Other fatty acids such as stearic, oleic, ricinoleic, cocoanut oil fatty acids, as well as abietic acid (rosin) and similar natural resin acids or naphthenic acids, can be used in place of linseed oil acids employed above.

In the above examples, the phenols or cresol may be replaced by a molecularly equivalent amount of chlorophenol, xylenol, guaicol resorcinol, and the other types of phenols mentioned herein to give similar resins according to the known art which are then capable of condensing with formaldehyde and a strongly basic secondary amine free of aromatic groups, to produce high molecular weight resinous amines analogous to those described.

Variations in the above procedure may be made, such as using a mixture of two or more amines or of phenolic-formaldehyde resins; or using different inert solvents or different temperatures but essentially the principle of the invention is the same. The water-soluble salts of the resinous amines obtainable, as described herein, can be used in metal pickling baths as inhibitors of corrosion, as emulsifiers in removing grease from metal objects in an acid bath and for many other purposes. The oil-soluble resinous amine salts can be used as varnish coatings, for laminating, in plastics and the like. The resinous amines themselves can be used in rubber compounding as strong bases for vulcanization accelerators, and as softeners.

Amine salts of the reactive type as described above, which are soluble in water, may be used for the impregnation of fabrics or paper in making laminated materials, and after the evaporation of the water and further heating, they will go over to the insoluble stage, thus yielding a strong, laminated article.

It is to be understood that the scope of this invention is not limited by any of the examples given herein, but is only limited within the scope of the following claims.

What I claim is:—

1. The process for preparing resinous amines which comprises reacting on a soluble, fusible phenolic-formaldehyde resin with additional formaldehyde and a strongly basic, non-aromatic secondary amine, at least one mol of said secondary amine and at least one mol of additional formaldehyde being employed for each mol equivalent to said phenolic-formaldehyde resin.

2. The process for preparing resinous amines which comprises reacting on a soluble, fusible phenolic-formaldehyde resin with additional formaldehyde and a strongly basic, non-aromatic secondary amine, at least one mol of said secondary amine and at least one mol of additional formaldehyde being employed for each mol equivalent of said phenolic-formaldehyde resin, the reaction being carried out in the presence of an inert organic liquid which is a solvent for the said phenolic-formaldehyde resin.

3. The process for preparing resinous amines which comprises reacting on a soluble, fusible phenolic-formaldehyde resin with additional formaldehyde and a strongly basic, non-aromatic secondary amine, at least one mol of said secondary amine and at least one mol of additional formaldehyde being employed for each mol equivalent of said phenolic-formaldehyde resin, the reaction being carried out in the presence of an inert organic liquid which is a solvent for the said phenolic-formaldehyde resin, said formaldehyde and said secondary amine being present in the ratio of at least one mol of formaldehyde to one mol of the amine.

4. The process for preparing resinous amines which comprise reacting on a soluble, fusible phenolic-formaldehyde resin with additional formaldehyde and a strongly basic, non-aromatic secondary amine, which is one of the group consisting of dimethylamine, diethylamine, methylethylamine, the isomeric dipropylamines, dibutylamines and diamylamines, piperidine and diethanolamine, at least one mol of said secondary amine and at least one mol of additional formaldehyde being employed for each mol equivalent of said phenolic-formaldehyde resin.

5. The process of preparing a resinous amine which comprises reacting on one mol equivalent of a fusible soluble condensation product of phenol and formaldehyde with at least one mol of additional formaldehyde and at least one mol of dimethylamine.

6. The process of preparing a resinous amine which comprises reacting on one mol equivalent of a fusible soluble condensation product of cresol and formaldehyde with at least one mol of additional formaldehyde and at least one mol of dimethylamine.

7. The process of preparing a resinous amine which comprises reacting on one mol equivalent of a fusible, soluble condensation product of diphenylolpropane and formaldehyde with at least one mol of additional formaldehyde and at least one mol of dimethylamine.

8. The process for preparing a resinous amine which comprises reacting on one mol equivalent of a fusible, soluble phenol-formaldehyde resin with at least one mol of additional formaldehyde and at least one mol of a strongly basic, non-aromatic secondary amine.

9. The process for preparing resinous amines in the form of resinous salts which comprises reacting on one mol equivalent of a fusible, soluble phenolic-formaldehyde resin with at least one mol of additional formaldehyde and at least one mol of a strongly basic, non-aromatic secondary amine and treating the product thus obtained with an acid.

10. The process for preparing resinous amines in the form of resinous salts which comprises reacting on one mol equivalent of a fusible, soluble phenolic-formaldehyde resin with at least one mol of additional formaldehyde and at least one mol of a strongly basic, non-aromatic secondary amine and treating the product thus obtained with one of the group consisting of inorganic acids, fatty acids, natural resin acids, polycarboxylic acids and naphthenic acids.

11. A resinous condensation product of a fusible, soluble phenolic-formaldehyde resin, a strongly basic non-aromatic secondary amine and formaldehyde, said resinous product being capable of forming an amine salt on treatment with an acid.

12. A resinous condensation product of a fusible, soluble phenolic-formaldehyde resin, formaldehyde and one of the group consisting of dimethylamine, diethylamine, methylethylamine, the isomeric dipropylamines, dibutylamines and diamylamines, piperidine and diethanolamine, said resinous product being capable of forming an amine salt on treatment with an acid.

13. A resinous condensation product of a fusible, soluble phenolic-formaldehyde resin, formaldehyde and at least one of the group consisting of dimethylamine, diethylamine, methylethylamine, the isomeric dipropylamines, dibutylamines and diamylamines, piperidine and diethanolamine, said resinous product being capable of forming an amine salt on treatment with an acid.

14. A resinous condensation product of a fusible, soluble phenolic-formaldehyde resin, formaldehyde and one of the group consisting of dimethylamine, diethylamine, methylethylamine, the isomeric dipropylamines, dibutylamines and diamylamines, piperidine and diethanolamine, said resinous product being capable of forming an amine salt on treatment with an acid which is one of the group consisting of inorganic acids, fatty acids, natural resin acids, polycarboxylic acids and naphthenic acids.

15. A resinous condensation product of a fusible, soluble phenol-formaldehyde resin, dimethylamine, and formaldehyde, said resinous product being soluble in dilute aqueous acetic acid solution.

16. A resinous condensation product of a fusible, soluble cresol-formaldehyde resin, dimethylamine and formaldehyde, said resinous product being soluble in dilute aqueous acid solution.

17. A resinous condensation product of a fusible, soluble diphenylol-propane-formaldehyde resin, dimethylamine and formaldehyde, said resinous product being soluble in dilute aqueous acetic acid solution.

18. A resinous amine soap consisting of a condensation product of a fusible, soluble phenolic formaldehyde resin, with at least one mol-equivalent each of formaldehyde and a strongly-basic, non-aromatic secondary amine, which condensation product has been neutralized with an acid.

19. A resinous amine soap consisting of a condensation product of a fusible, soluble phenolic formaldehyde resin, with at least one mol-equivalent each of formaldehyde and a strongly basic, non-aromatic secondary amine, which condensation product has been neutralized with a water soluble acid.

20. A resinous amine soap consisting of a condensation product of a fusible, soluble phenolic formaldehyde resin, with at least one mol-equivalent each of formaldehyde and a strongly basic, non-aromatic secondary amine, which condensation product has been neutralized with a soap-forming acid.

HERMAN A. BRUSON.